US006833869B1

(12) United States Patent
Okamoto

(10) Patent No.: US 6,833,869 B1
(45) Date of Patent: *Dec. 21, 2004

(54) SOLID-STATE IMAGING DEVICE WITH VOLTAGE FOLLOWERS FORMED BY SELECTED ROW TRANSISTORS AND COLUMN TRANSISTORS

(75) Inventor: Fuyuki Okamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/551,102

(22) Filed: Apr. 18, 2000

(30) Foreign Application Priority Data

Apr. 22, 1999 (JP) ............................................ 11-114494

(51) Int. Cl.[7] .......................... H04N 3/14; H04N 5/335
(52) U.S. Cl. .................................. 348/294; 250/208.1
(58) Field of Search ................................ 348/241, 296, 348/302, 304, 308, 245, 294; 257/229, 230; 250/208.1, 214 A

(56) References Cited

U.S. PATENT DOCUMENTS

| | | | | | |
|---|---|---|---|---|---|
| 5,880,460 | A | * | 3/1999 | Merrill | 250/208.1 |
| 5,886,353 | A | * | 3/1999 | Spivey et al. | 250/370.09 |
| 5,886,659 | A | * | 3/1999 | Pain et al. | 341/155 |
| 5,998,779 | A | * | 12/1999 | Kozuka | 250/208.1 |
| 6,093,924 | A | * | 7/2000 | Afghahi | 250/208.1 |
| 6,111,242 | A | * | 8/2000 | Afghahi | 250/208.1 |
| 6,118,115 | A | * | 9/2000 | Kozuka et al. | 250/208.1 |
| 6,130,423 | A | * | 10/2000 | Brehmer et al. | 250/208.1 |
| 6,476,864 | B1 | * | 11/2002 | Borg et al. | 348/245 |
| 6,538,695 | B1 | * | 3/2003 | Xiao et al. | 348/245 |
| 6,580,063 | B1 | * | 6/2003 | Okamoto | 250/208.1 |
| 2001/0012070 | A1 | * | 8/2001 | Enod et al. | 348/302 |

FOREIGN PATENT DOCUMENTS

| | | |
|---|---|---|
| JP | 60-058779 | 4/1985 |
| JP | 02-165674 | 6/1990 |

OTHER PUBLICATIONS

Eichenberger et al., Dummy Transistor Compensation of Analog MOS Switches, Aug. 4, 1989, IEEE.*

* cited by examiner

Primary Examiner—Vu Le
Assistant Examiner—Kelly L. Jerabek
(74) Attorney, Agent, or Firm—Katten Muchin; Zavis Rosenman

(57) ABSTRACT

A solid-state imaging device has an array of pixels arranged in a matrix pattern of rows and columns. Each pixel has a photodiode for developing a voltage corresponding to light incident thereon, a first amplifying transistor for amplifying the voltage and a row select switching transistor responsive to a row select signal from a row line for coupling the amplified voltage to a column line. Multiple second amplifying transistors are respectively connected to multiple column lines. When the row select switching transistors of the pixels in one of the rows are turned on in response to a row select signal, the second amplifying transistors and the first amplifying transistors of the selected row jointly constitute voltage followers for respectively amplifying the voltages coupled to the column lines. Multiple column select switching transistors provide sequentially coupling of the outputs of the voltage followers to an output line in response to column select signals.

19 Claims, 3 Drawing Sheets

SOLID-STATE IMAGING DEVICE WITH VOLTAGE FOLLOWERS FORMED BY SELECTED ROW TRANSISTORS AND COLUMN TRANSISTORS

BACKGROUND OF THE INVENTION

1. Field of the Invention

The present invention relates generally to solid-state imaging devices, and more specifically to a solid-state imaging device of active-pixel type where each pixel includes a transistor for amplifying the voltage developed by an associated photodiode.

2. Description of the Related Art

A prior art solid-state imaging device of the active-pixel type, shown in FIG. 1, includes a plurality of active pixels 100 arranged in a matrix pattern of rows and columns, with the rows having associated row select lines 105 and row reset lines 106 connected to a row scanner 110 and the columns having associated column select lines 108 connected to a column scanner 111 via associated column select circuits 120. Each active pixel consists of a photodiode 101, a row reset transistor 102, an amplifying transistor 103 and a row-select transistor 104. When a given row is accessed by the row scanner, the associated reset line 106 is driven high and all of its row-reset transistors 102 are turned on, allowing voltages to be injected into all of its photodiodes 101 from an associated power (source voltage) line 107. The reset line 106 of the given row is then driven low to turn off all of its reset transistors 102. This allows the photodiodes of the given row to be exposed to incident light for a predetermined amount of time. During this exposure, currents are drained to ground from the photodiodes in proportion to the intensities of light incident on the respective photodiodes. At the end of the exposure time, the row select line 105 of the given row is driven high so that its row select transistors 104 are turned on. All the outputs of its photodiodes 101 are amplified by the corresponding transistors 103 and the amplified voltages appear at the column select lines 108, respectively.

Each column-select circuit 120 includes a constant-current source transistor 109 (which is biased by a suitable voltage on a bias line 115) and a column-select transistor 112. For each column, the constant-current source transistor 109 forms a source follower with the amplifying transistor 103 of a row selected pixel 100 of the column. While a given row is selected, the column select transistors 112 are scanned by the column scanner 111 so that they are sequentially turned on to transfer the voltages respectively developed at the column-select lines 108 to an output line 113, where the signals are serially read out into external circuitry via an output buffer 114.

If the source-followers are implemented so that their amplification gain meets the design objective, the voltage developed at each column-select line 108 is equal to the voltage at the gate of each amplifying transistor 103 (i.e., the voltage developed by each photodiode 101). However, due to the effect of a backplane bias of the integrated-circuit chip, the voltage developed at each column select line is not equal to the voltage developed by each photodiode. Therefore, the actual gain of the source follower falls far short of the ideal, typically at 75 percent of the design objective. If the photodiodes can deliver an output voltage of from zero to 3 volts, the voltage at the column select lines will only swing in the full-scale range between zero and 0.23 volts. The prior art solid-state imaging device of this type is therefore less robust to external noise. Moreover, since the reset voltage of the photodiodes is supplied from the power lines 107, the full-scale range of the photodiodes is determined by the power supply voltage. Further, the recent trend of the integrated circuit technology is toward using low power supply voltages. If the imaging device were to operate on a lower voltage, it is obvious that it will suffer from the inability of the photodiodes to deliver a sufficient voltage. Therefore, a costly, high precision analog-to-digital converter would be needed to resolve the small amplitude signals.

SUMMARY OF THE INVENTION

It is therefore an object of the present invention to provide a solid-state imaging device capable of delivering high amplitude output signals.

In broader terms, the solid-state imaging device of the present invention comprises a plurality of photodiodes, a plurality of first amplifying transistors for respectively amplifying voltages developed by the photodiodes, a plurality of switching transistors corresponding to the first amplifying transistors for selectively coupling one of the amplified voltages to a common conductor in response to a control signal, and at least one second amplifying transistor connected to the common conductor. The second amplifying transistor jointly forms a voltage follower with each of the first amplifying transistors when each of the switching transistors is turned on in response to the control signal for amplifying the voltage coupled to the common conductor.

In a narrower aspect, the solid-state imaging device of this invention comprises a plurality of photodiodes, a plurality of first amplifying transistors for respectively amplifying voltages developed by the photodiodes, a plurality of switching transistors responsive to a control signal for coupling the amplified voltage to a plurality of conductors; and a plurality of second amplifying transistors respectively connected to the conductors, the second amplifying transistors and the first amplifying transistors jointly forming a plurality of voltage followers when the switching transistors are turned on in response to the control signal for respectively amplifying the voltages coupled to the conductors.

In the disclosed embodiment of the invention, the solid-state imaging device comprises a plurality of row lines, a plurality of column lines, and an array of pixels arranged in a matrix pattern of rows and columns. Each pixel comprises a photodiode for developing a voltage corresponding to light incident thereon, a first amplifying transistor for amplifying the voltage and a row select switching transistor responsive to a row select signal from a corresponding one of the row lines for coupling the amplified voltage to a corresponding one of the column lines. A plurality of second amplifying transistors are respectively connected to the column lines. When the row select switching transistors of the pixels in the selected row are turned on in response to the row select signal, the second amplifying transistors and the first amplifying transistors of the pixels arranged in a selected one of the rows jointly constitute a plurality of voltage followers for respectively amplifying the voltages coupled to the column lines. A plurality of column select switching transistors are provided for sequentially coupling outputs of the voltage followers to an output line in response to column select signals.

BRIEF DESCRIPTION OF THE DRAWINGS

The present invention will be described in further detail with reference to the accompanying drawings, in which.

DETAILED DESCRIPTION

Figure 2:
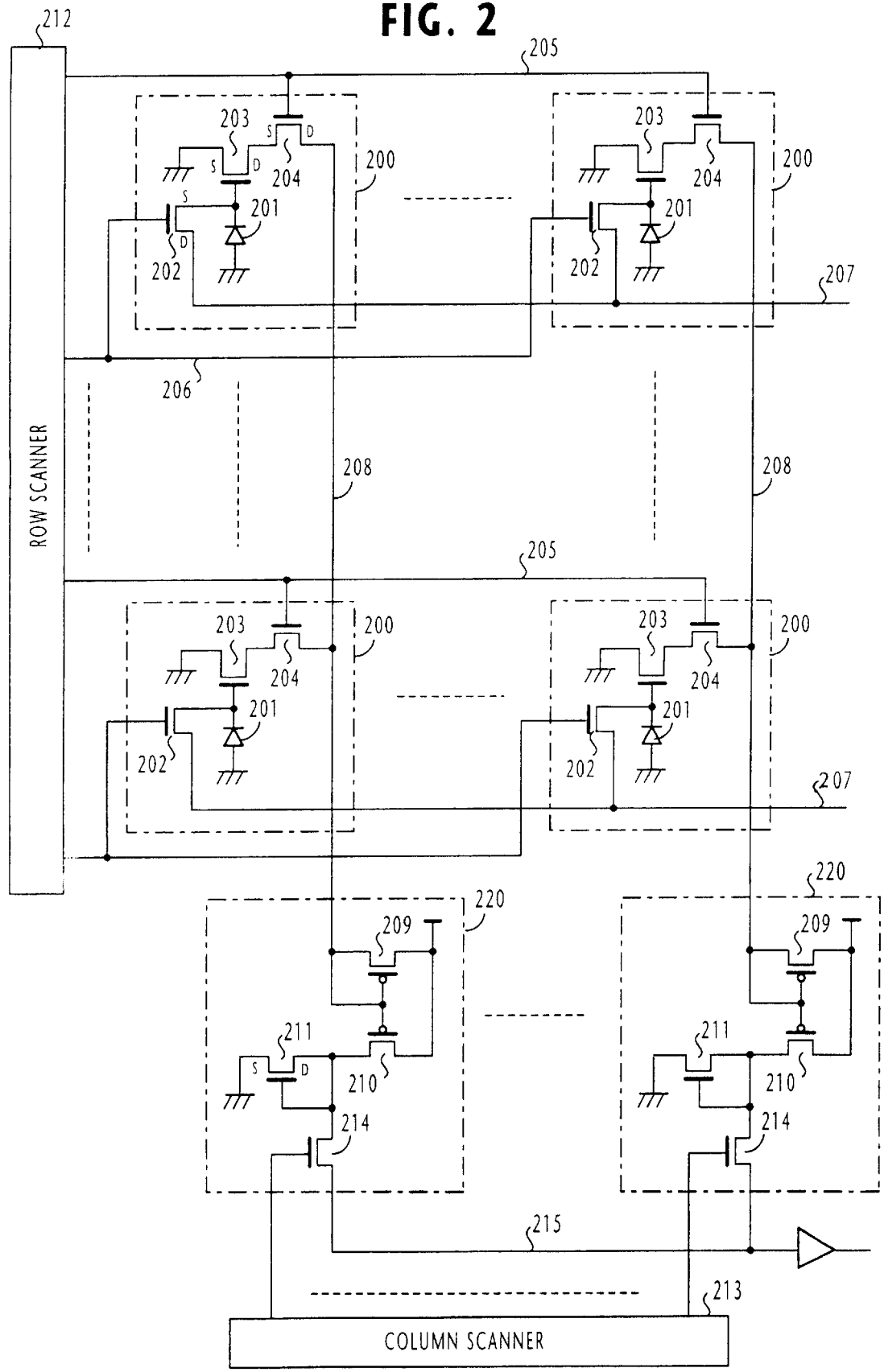
FIG. 2 is a circuit diagram of a solid-state imaging device according to one embodiment of the present invention.

Referring now to FIG. 2, there is shown a solid-state imaging device according to one embodiment of the present invention.

The solid-state imaging device of FIG. 2 includes a matrix array of active pixels 200, with the rows of the array having associated row select lines 205 and row reset lines 206 connected to a row scanner 212 and the columns having associated column select lines 208 connected to a column scanner 213 via associated column-select circuits 220.

Figure 1:
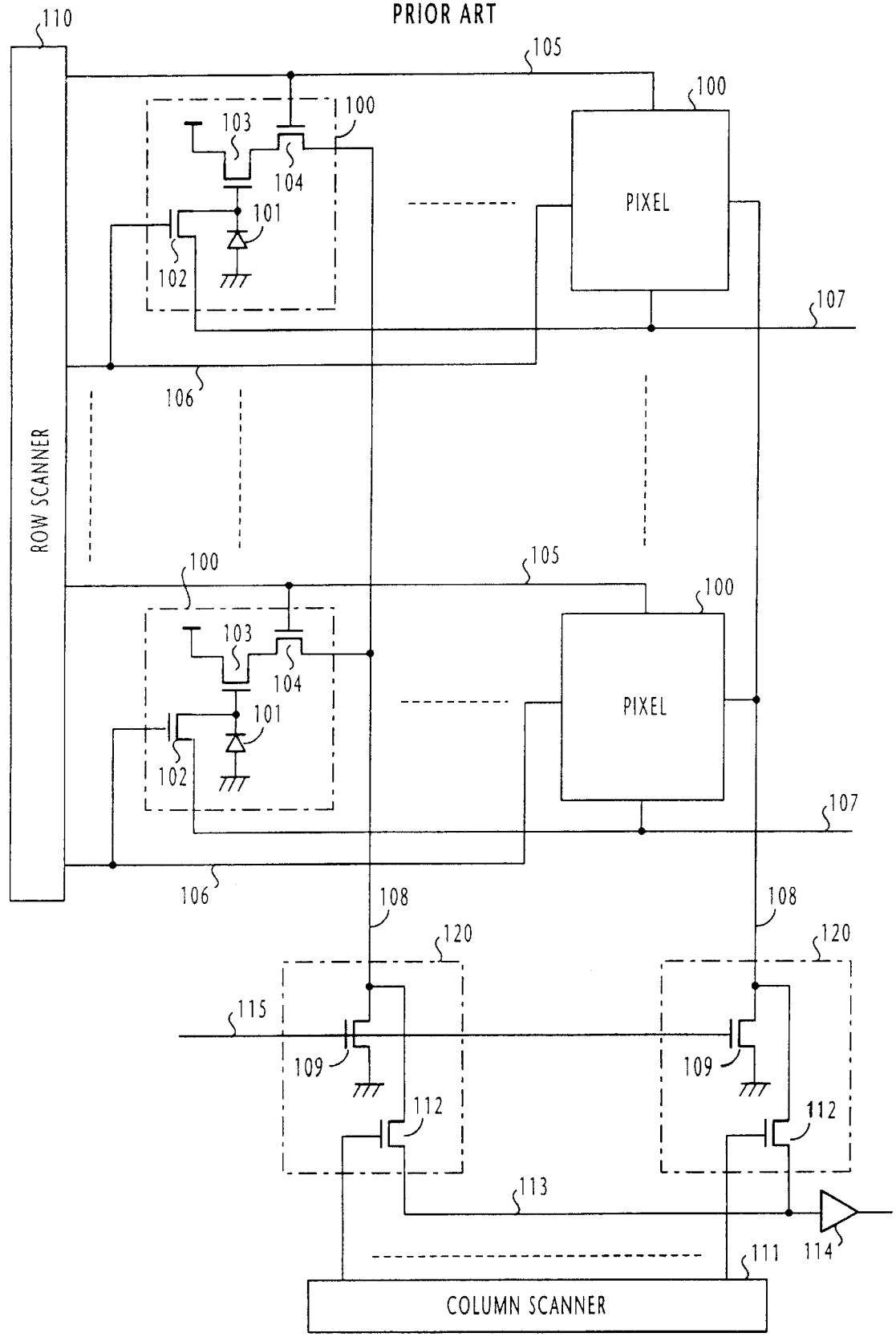
FIG. 1 is a circuit diagram of a prior art solid-state imaging device.

Each active pixel consists of a photodiode 201, a row-reset switching transistor 202, an amplifying transistor 203 and a row-select switching transistor 204. All of these transistors are implemented with n-type metal-oxide field-effect transistors (n-MOSFETs). In each pixel, the row-reset switching transistor 202 has its gate connected to the row-reset line 206, its drain connected to a reset line 207 and its source connected to a circuit node between the cathode of an anode-grounded photodiode 201 and the gate of transistor 203. The amplifying transistor 203 has its source connected to ground and its drain connected to the source of row-select switching transistor 204 whose gate is connected to the associated row-select line 205 and whose drain is connected to the associated column-select line 208. Note that the source of amplifying transistor 203 is connected to ground, rather than to a bias voltage terminal to which the source of transistor 103 of FIG. 1 is connected.

Each column-select circuit 220 includes a current-mirror active loading circuit formed by a pair of transistors 209 and 210 implemented in a p-MOSFET structure. Transistor 209 is connected to the associated column-select line 208 to provide a reference loading function and transistor 210 provides an output loading function. An amplifying n-MOS field-effect transistor 211 has its source connected to ground and its gate and drain connected together to the output loading transistor 210. An n-MOS field-effect switching transistor 214 provides the column-select function by connecting its source-drain path between the gate-drain node of the amplifying transistor 211 and an output line 215 and its gate to a corresponding output terminal of the column scanner 213.

When a given row is accessed by the row scanner 212, the associated reset line 206 is driven high and all of its row-reset transistors 202 are turned on, allowing charges to be injected into all of its photodiodes 201 from the associated power (source voltage) line 207. The reset line 206 of the given row is then driven low to turn off all of its reset transistors 202 so that a predetermined amount of charge is injected into each of the photodiodes of the accessed row. With the turn-off the reset transistors, exposure to light begins and the stored charges of the given row are drained to ground in proportion to the intensities of light incident on the respective photodiodes for a predetermined amount of time. At the end of the exposure, the row-select line 205 of the given row is driven high so that its row-select transistors 204 are turned on. The output voltages of its photodiodes 201 are amplified by the corresponding transistors 203 and the amplified voltages appear at the column select lines 208 where the current-mirror transistors 209, 210 of the associated column-select circuits 220 are connected.

In more detail, when the row-select switching transistor 204 of a given pixel is turned on in response to a signal from the row scanner 212 and the column-select switching transistor 214 of a given column is activated in response to a signal from the column scanner 213, the amplifying transistor 203 of this pixel is connected to the amplifying transistor 211 of the activated column. A differential amplifier is now jointly formed with the two amplifying transistors 203, 211 and preferably with the current-mirror active load transistors 209, 210. In this differential amplifier configuration, the gate of transistor 203 receives the output of the associated photodiode as a non-inverting input and the gate of transistor 211 receives its drain voltage as an inverting input, and the current-mirror transistors 209 and 210 operate as active loads of the amplifying transistors 203 and 211, respectively. Since the drain output of the amplifying transistor 211 is negatively fed back to its gate, the differential amplifier operates as a voltage follower, or a unity gain amplifier. Therefore, the output of each differential amplifier (which appears on the output line 215) is of the same amplitude as the output of the photodiode of each active pixel.

The high level output voltages of the voltage followers are sufficient to overcome the problem caused by the bias effect of the backplane. Accordingly, a high precision A/D converter is not required and a robust solid-state imaging device can be implemented advantageously for applications where the operating power supply voltage is low.

It is seen in FIG. 2 that in each pixel the amplifying transistor 203 is connected to the current-mirror circuit via the row-select switching transistor 204, while there is no transistor between the amplifying transistor 211 and the current-mirror circuit. If symmetrical configuration is important, it is preferable to provide a switching transistor between the amplifying transistor 211 and the current-mirror circuit corresponding in significance to the row-select switching transistor 204.

Figure 3:
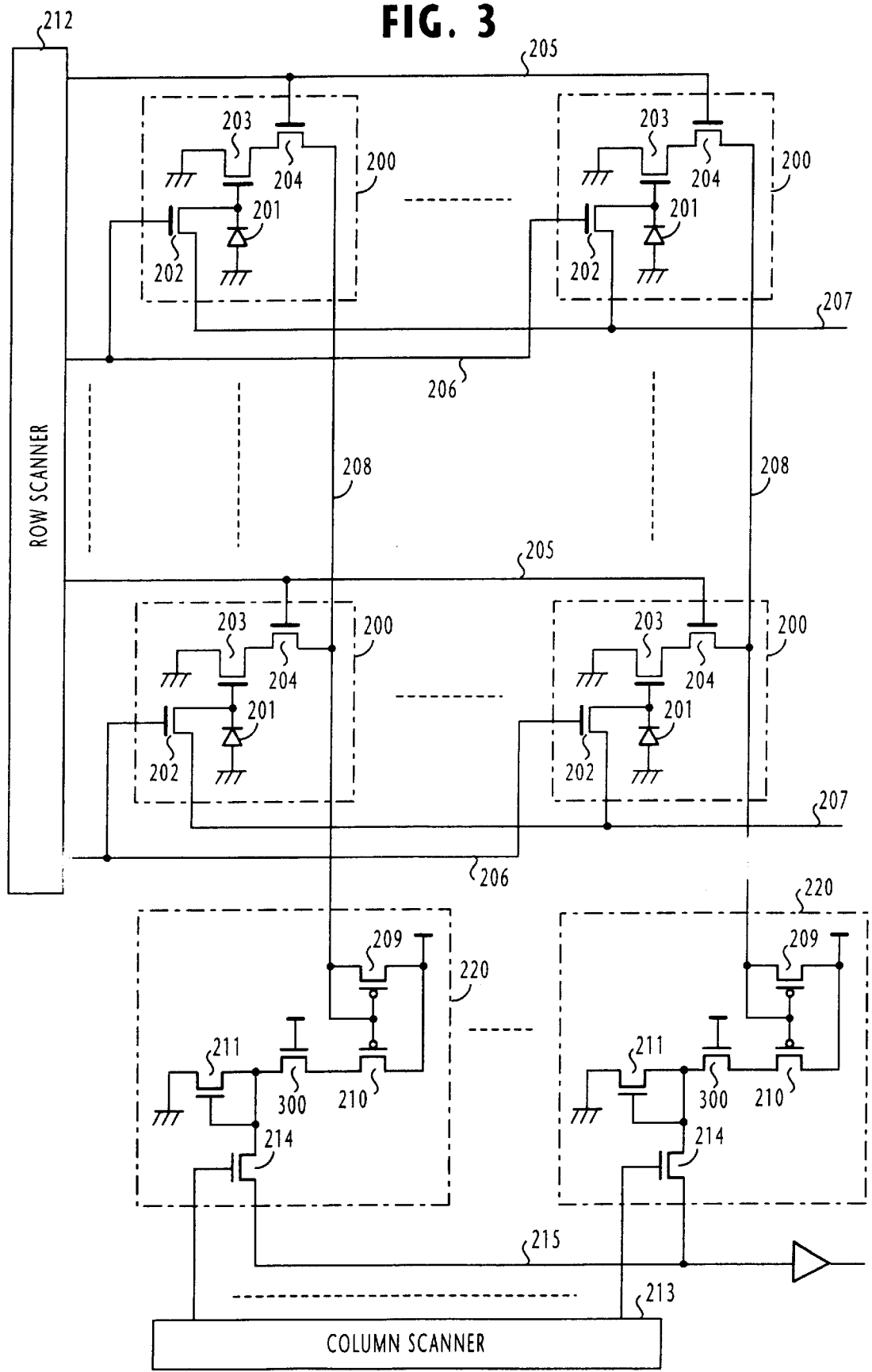
FIG. 3 is a circuit diagram of a solid-state imaging device according to a preferred embodiment of the present invention.

For this reason, each column select circuit 220, shown in FIG. 3, further includes a switching transistor 300 of n-MOSFET structure whose source-drain path is connected between the amplifying transistor 211 and the p-MOS field-effect transistor 210 and whose gate is connected to a bias voltage terminal. With this symmetrical circuit configuration, the transistors 300 act as dummy elements corresponding to the switching transistors 204 to prevent undesired offset voltages, which would otherwise be produced by asymmetric circuitry.

What is claimed is:

1. A solid-state imaging device comprising:
   a plurality of photodiodes;
   a plurality of first amplifying transistors for respectively amplifying voltages developed by said photodiodes, a source of each of said plurality of first amplifying transistors being connected directly to ground;
   a plurality of switching transistors corresponding to said first amplifying transistors for selectively coupling one of the amplified voltages to a common conductor in response to a control signal; and
   a second amplifying transistor connected to said common conductor, the second amplifying transistor having a source connected directly to ground and a drain connected through said common conductor to a drain of each of said amplifying transistors for jointly forming a differential amplifier when one of said switching transistors is turned on in response to said control signal,
   said second amplifying transistor having the drain thereof connected to a gate electrode thereof to form a voltage follower for amplifying the voltage coupled to the common conductor.

2. A solid-state imaging device as claimed in claim 1, further comprising a dummy element connected to said second amplifying transistor as a corresponding element to each of said switching transistors.

3. A solid-state imaging device as claimed in claim 2, wherein said dummy element is a transistor similar to each of said switching transistors.

4. A solid-state imaging device as claimed in claim 1, wherein said voltage follower further comprises a pair of transistors of a current-mirror configuration.

5. A solid-state imaging device as claimed in claim 2, wherein said voltage follower further comprises a pair of transistors of a current-mirror configuration.

6. A solid-state imaging device as claimed in claim 1, further comprising a plurality of second switching transistors responsive to a reset signal for injecting a predetermined amount of charge from a voltage source into said plurality of photodiodes.

7. A solid-state imaging device as claimed in claim 2, further comprising a plurality of second switching transistors responsive to a reset signal for injecting a predetermined amount of charge from a voltage source into said photodiodes.

8. A solid-state imaging device comprising:

a plurality of common conductors;

a plurality of photodiodes divided into groups corresponding respectively to said common conductors;

a plurality of first amplifying transistors divided into groups corresponding respectively to the groups of said photodiodes, the first amplifying transistors of each group respectively amplifying voltages developed by the photodiodes of the corresponding group, a source of each of said plurality of first amplifying transistors being connected directly to ground;

a plurality of switching transistors divided into groups corresponding respectively to the groups of said photodiodes, said switching transistors of each group being responsive to a control signal for selectively coupling the amplified voltages to a corresponding one of said common conductors; and a plurality of second amplifying transistors corresponding respectively to the groups of said first amplifying transistors and the groups of said switching transistors, each of the second amplifying transistors having a source connected directly to ground and a drain connected to a drain of each of the first amplifying transistors of the corresponding group through one of said common conductors for jointly forming a differential amplifier when each switching transistor of the corresponding group is turned on in response to said control signal, each of the second amplifying transistors having the drain thereof connected to a gate electrode thereof to form a voltage follower for amplifying a voltage selectively coupled to the connected common conductor.

9. A solid-state imaging device as claimed in claim 8, further comprising a plurality of dummy elements respectively connected to said second amplifying transistors as corresponding elements to said switching transistors.

10. A solid-state imaging device as claimed in claim 9, wherein said dummy elements are transistors similar to the switching transistors.

11. A solid-state imaging device as claimed in claim 8, wherein each of said voltage followers further comprises a pair of transistors of a current-mirror configuration, the transistors of the pair being connected respectively to the first and second amplifying transistors of the voltage follower.

12. A solid-state imaging device as claimed in claim 9, wherein each of said voltage followers further comprises a pair of transistors of a current-mirror configuration, the transistors of the pair being connected respectively to the first and second amplifying transistors of the voltage follower.

13. A solid-state imaging device as claimed in claim 8, further comprising a plurality of second switching transistors responsive to a reset signal for injecting a predetermined amount of charge from a voltage source into said photodiodes.

14. A solid-state imaging device comprising:

a plurality of row lines;

a plurality of column lines;

an array of pixels arranged in a matrix pattern of rows and columns, said pixels being connected to said row lines and said column lines, each pixel comprising a photodiode for developing a voltage corresponding to light incident thereon, a first amplifying transistor for amplifying the voltage, a source of said first amplifying transistor being connected directly to ground, and a row select switching transistor responsive to a row select signal from a corresponding one of said row lines for coupling the amplified voltage to a corresponding one of said column lines;

a plurality of second amplifying transistors respectively connected to said column lines, each of said plurality of second amplifying transistors having a source directly connected to ground and a drain connected through the respective column line to a drain of each of the first amplifying transistors of the pixels of the same column line as said each second amplifying transistor for jointly forming a differential amplifier when each of the row select switching transistors of the pixels of said same column line is turned on in response to said row select signal, each of the second amplifying transistors having the drain thereof connected to a gate electrode thereof to form a voltage follower for amplifying a voltage selectively coupled to the connected column line; and a plurality of column select switching transistors, each of the column select switching transistors coupling the voltage follower of each column line to an output line in response to column select signal.

15. A solid-state imaging device as claimed in claim 14, further comprising a plurality of dummy elements respectively connected to said second amplifying transistors as corresponding elements to said row select switching transistors.

16. A solid-state imaging device as claimed in claim 15, wherein said dummy elements are transistors similar to the switching transistors of the pixels.

17. A solid-state imaging device as claimed in claim 14, wherein each of said voltage followers further comprises a pair of transistors of a current-mirror configuration, the transistors of the pair being connected respectively to the first and second amplifying transistors of the voltage follower.

18. A solid-state imaging device as claimed in claim 15, wherein each of said voltage followers further comprises a pair of transistors of a current-mirror configuration, the transistors of the pair being connected respectively to the first and second amplifying transistors of the voltage follower.

19. A solid-state imaging device as claimed in claim 14, wherein each of said pixels further comprises a switching transistor responsive to a reset signal for injecting a predetermined amount of charge from a voltage source into the photodiode of the pixel.

* * * * *